United States Patent
Lesage et al.

(10) Patent No.: US 10,875,001 B2
(45) Date of Patent: Dec. 29, 2020

(54) ENCLOSURE OF AN FCC UNIT COMPRISING AN INNER SUPPORT DEVICE RIGIDLY CONNECTED TO CYCLONES

(71) Applicant: Total Raffinage Chimie, Courbevoie (FR)

(72) Inventors: Romain Lesage, Antwerp (BE); Hubert Simon, Le Havre (FR); Sebastien Decker, Octeville sur Mer (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 0 days.

(21) Appl. No.: 16/489,031

(22) PCT Filed: Feb. 22, 2018

(86) PCT No.: PCT/EP2018/054444
§ 371 (c)(1),
(2) Date: Aug. 27, 2019

(87) PCT Pub. No.: WO2018/154022
PCT Pub. Date: Aug. 30, 2018

(65) Prior Publication Data
US 2020/0001260 A1    Jan. 2, 2020

(30) Foreign Application Priority Data
Feb. 27, 2017    (FR) ...................................... 17 51531

(51) Int. Cl.
*B01J 8/00*    (2006.01)
*B01J 8/18*    (2006.01)
(Continued)

(52) U.S. Cl.
CPC ........... *B01J 8/0055* (2013.01); *B01J 8/1827* (2013.01); *B01J 8/1872* (2013.01); *B04C 5/28* (2013.01);
(Continued)

(58) Field of Classification Search
CPC ... B01J 8/00; B01J 8/005; B01J 8/0055; B01J 8/18; B01J 8/1818; B01J 8/1827;
(Continued)

(56) References Cited

U.S. PATENT DOCUMENTS 3,982,902 A * 9/1976 Lortz .................... B01J 8/0055
                                                    422/147
4,426,212 A    1/1984 Zacher
2015/0158034 A1   6/2015 Tammera

FOREIGN PATENT DOCUMENTS

FR    1128564 A    1/1957
GB    2362117 A    11/2001
(Continued)

OTHER PUBLICATIONS

International Search Report issued in Application No. PCT/EP2018/054444, dated May 9, 2018, 7 pages.

*Primary Examiner* — Natasha E Young
(74) *Attorney, Agent, or Firm* — Albert Shung (57) ABSTRACT

The invention relates to an enclosure (10) of a fluid catalytic cracking unit in which an inner space is defined by a side wall (12) having a longitudinal axis extending substantially in the direction of gravity, said enclosure being provided with a plurality of mechanical separation cyclones (14, 16) located inside the inner space. The enclosure (10) comprises a supporting device (20) attached only to the cyclones (14, 16) by: an annular peripheral support element (202) extending along the side wall (12) in a plane perpendicular to the longitudinal axis (X), separated from the side wall by a predetermined clearance; and a plurality of beams (206, 208)

(Continued)

extending in the same plane as the peripheral support element (202), the beams being rigidly connected to the peripheral support element and to at least one mechanical separation cyclone by one end or by an attachment part distant from the ends thereof.

16 Claims, 4 Drawing Sheets

(51) Int. Cl.
  *B04C 5/28* (2006.01)
  *C10G 11/18* (2006.01)
(52) U.S. Cl.
  CPC ..... *C10G 11/18* (2013.01); *B01J 2208/00761* (2013.01); *B01J 2208/00991* (2013.01); *C10G 2300/4031* (2013.01); *C10G 2300/4056* (2013.01); *C10G 2300/4075* (2013.01)

(58) Field of Classification Search
  CPC .................. B01J 8/1872; B01J 2208/00; B01J 2208/00743; B01J 2208/00761; B01J 2208/00796; B01J 2208/00991; B04C 5/00; B04C 5/24; B04C 5/28; C10G 11/00; C10G 11/14; C10G 11/18; C10G 11/182; C10G 2300/00; C10G 2300/40; C10G 2300/4031; C10G 2300/4056; C10G 2300/4072
  See application file for complete search history.

(56) References Cited

FOREIGN PATENT DOCUMENTS

| | | |
|---|---|---|
| WO | 2010011647 A2 | 1/2010 |
| WO | 2012022910 A1 | 2/2012 |

\* cited by examiner

ENCLOSURE OF AN FCC UNIT COMPRISING AN INNER SUPPORT DEVICE RIGIDLY CONNECTED TO CYCLONES

CROSS-REFERENCE TO RELATED APPLICATIONS

This application claims the benefit of PCT/EP2018/054444, now WO2018153022 filed Feb. 22, 2018, which claims priority from FR 1751531 filed Feb. 27, 2017, which are incorporated herein by reference in their entireties for all purposes.

The invention relates to a chamber of a fluid catalytic cracking unit, notably a chamber of a regenerator comprising an internal support device fixed to these cyclones.

In the field of refinery and notably in the field of fluid catalytic cracking (FCC) units it is commonplace for functional elements to be situated inside a chamber. Thus, in an FCC unit reactor or regenerator, the upper part contains mechanical separation cyclones for separating particles suspended in a gaseous fluid, and possibly internal packings extending over the entire cross section of the chamber and limiting the entrainment of the catalytic particles, as described in document WO 2012022910.

It is therefore necessary to envision fitting support elements for supporting these internal packings in the vicinity of the mechanical separation cyclones. Such supports are generally fixed to the lateral wall of the chamber and need to be able to be installed despite the space taken up by the internal equipment of the chamber, such as the mechanical separation cyclones, possibly a central reactor, an entrainment (lift) gas pipe, etc. These supports are in fact usually fixed both to the lateral wall of the chamber and to the internal equipment, generally the cyclones.

During the operations of starting up and shutting down the facility, phenomena of differential expansion between the various internal equipment of the chamber, including the internal packing supports, and the wall of this chamber are therefore observed: these supports are liable to move in different directions on their side fixed to the lateral wall of the chamber and on their side fixed to the internal equipment. This may lead to a loss of horizontality of the supports, something which is not desirable.

Because of the relatively large amount of space occupied by the existing equipment and because of the phenomena of differential expansion, it may prove difficult to install supports inside the chamber, notably robust supports.

The invention seeks to overcome all or some of these disadvantages by proposing a chamber of a catalytic cracking unit provided with a support device which is less sensitive to the phenomenon of differential expansion and which can be installed despite the reduced amount of space available.

To this end, one first subject of the invention is a chamber of a fluid catalytic cracking unit of which a lateral wall delimits an internal volume having a longitudinal axis extending in the direction of gravity, or substantially in the direction of gravity, said chamber being provided with a plurality of mechanical separation cyclones situated inside the internal volume, characterized in that it comprises, inside said internal volume, a support device secured only to the mechanical separation cyclones and comprising:
  a peripheral support element extending along the lateral wall in a plane perpendicular to the longitudinal axis, distant from the lateral wall by a predetermined clearance in the plane of the support element, notably a constant clearance,
  a plurality of beams extending in the same plane as the peripheral support element, the beams being secured to the peripheral support element and to at least one mechanical separation cyclone by an end or by a fixing part distant from its ends.

The arrangement according to the invention thus makes it possible to create a support device which is fixed only to the mechanical separation cyclones. In other words, none of the beams is secured to the lateral wall of the chamber. There is therefore no longer any phenomenon of differential expansion between the support device and the wall of the chamber on the one hand, and between the support device and the cyclones on the other hand. In addition, the support device arrangement described allows it to be installed despite the small amount of space left available by the plurality of mechanical separation cyclones present in the chamber. It will be noted that the peripheral support element may advantageously conform to the shape of the lateral wall of the chamber, namely mirror the shape thereof, being separated therefrom by said predetermined clearance. Finally, an upper face of the support device defines a planar surface which can robustly support a grate arranged perpendicular to the longitudinal axis of the chamber.

The peripheral support element extends some distance from the center of the chamber. It may notably be of annular shape.

Advantageously, the beams may be secured to one or two mechanical separation cyclones, notably adjacent cyclones, or even to a greater number of cyclones.

Advantageously, for better strength, all the beams may be rectilinear.

The support device may further comprise other beams extending in the same plane as the peripheral support element and chosen from one or more of the following beams:
  a beam secured to two mechanical separation cyclones, notably adjacent ones, by its ends or by fixing parts distant from its ends, and
  a beam connecting at least two other beams together, notably two.

In one embodiment, the support device may comprise several beams extending in the same plane as the peripheral support element and connecting other beams (notably beams secured to one or more cyclones) with criss-crossing, notably at a single point, these beams being secured to one another at the point(s) at which they cross. This may make it easier for the support device to support a grate and enhance the robustness of the support device.

In this case, beams connecting other beams may meet—be secured—at a central point of the internal volume. This may make it possible to make the structure of the support device more rigid.

In another embodiment, the support device may comprise a central support element extending near a central point of the internal volume, in the same plane as the peripheral support element.

In that case, the support device may comprise beams extending in the same plane as the peripheral support element and each connecting one or two mechanical separation cyclones, notably adjacent ones, to the central support element. This likewise makes it possible to obtain a robust structure for the support device.

In this embodiment, certain beams may also connect other beams together.

As an alternative or in combination, the support device may comprise beams extending in the same plane as the peripheral support element and connecting one or two mechanical separation cyclones, notably adjacent ones, to the central support element and to the peripheral support element.

This embodiment is particularly advantageous when the chamber has a tubular pipe situated inside the chamber and having a longitudinal axis parallel to the longitudinal axis of the internal lateral wall. The central support element may then be arranged around the tubular pipe and conform to the shape of this pipe while being separated therefrom by a predetermined clearance, notably a constant clearance, in the plane of the central support element. The central support element may then surround another item of internal equipment of the chamber, such as a tubular reactor, a catalyst transfer pipe, a gas lift pipe or the like, without being in contact therewith, so as to avoid potential differential-expansion phenomena.

The chamber according to the invention may further comprise one or more of the features listed hereinbelow.

At least some of the mechanical separation cyclones (in other words, some cyclones but not necessarily all of the cyclones) may comprise at least one support element configured to support a beam end or a beam fixing part. In particular, these support elements may be configured to accept and house a beam end or a beam fixing part.

Beams may be fixed to a mechanical separation cyclone via one of their ends, notably so that a longitudinal direction of these beams passes through a central point of the separation cyclone, in the plane in which the beam extends. This may make it possible to reduce the mechanical stresses experienced by a cyclone supporting a beam.

Beams may extend between two mechanical separation cyclones, notably adjacent ones, and be fixed to one or both mechanical separation cyclones. This may make it possible to equalize the mechanical stresses experienced by a beam, notably when it is situated between two cyclones, and enhance the robustness of the support device.

The peripheral support element and the central support element, where present, may be formed of several portions defined in the plane of the support element by angular sectors of which the center is a central point of the internal volume. This may make it easier to install the peripheral support element and, where present, the central support element, in the chamber, particularly if the peripheral support element is relatively large in size. One end of a beam may then be fixed to this support element between assembled ends of two adjacent portions. This may make it easier to fix the beams to the support element.

Each support element (peripheral support element, central support element or element for supporting the cyclone) may have an upper wall and a lower wall which are spaced apart, perpendicular to the longitudinal axis, and between which a beam end or a beam fixing part is fixed. The beams may thus be held in position by means of a support element produced in a simple way. These spaced-apart upper and lower walls may notably take the form of rings, within the geometric sense of the word.

The edges of the lower and upper walls of at least one support element may then be connected by an end wall so as to define a groove. This groove may then accept and house a beam end or a beam fixing part. The support elements are produced in a particularly simple way and allow the beams to be held in position in an effective way. Advantageously, the peripheral support element and the central support element, where present, each define grooves open toward one another, and which may notably accept fixing walls for the beams.

Each support element (notably peripheral, central or cyclone support element) may have a plurality of fixing walls connecting the upper and lower walls, these fixing walls extending parallel to the longitudinal axis of the lateral wall of the chamber. Each beam may then comprise at least one planar wall parallel to the longitudinal axis of the lateral wall, pressed against a fixing wall of a support element, parallel to the latter and secured to this fixing wall. This fixing may be achieved in a simple way using fixing elements such as screw-nut assemblies, pins, rivets, etc., or by welding.

The mechanical separation cyclones may be uniformly distributed with respect to the longitudinal axis, and notably may be distributed symmetrically. This allows a better distribution of mechanical stresses between the cyclones bearing the support device. The beams may then also be arranged symmetrically with respect to the longitudinal axis. Advantageously, all the cyclones of the chamber may support a beam.

A grate may be laid on an upper face of said support device, said grate conforming to the shape of the lateral wall, of the mechanical separation cyclones and of the cylindrical tubular pipe situated inside the chamber, when such a pipe is present, said grate being separated from these elements by a predetermined clearance, notably constant, in the plane of the support element. This grate may notably support an internal packing. Such a grate therefore does not experience any phenomenon of differential expansion between the lateral wall and the internal elements (cyclones, etc.) either.

The chamber according to the invention may be a chamber of a regenerator.

The invention is now described with reference to the attached nonlimiting drawings in which.

In the present description, the terms upper, lower refer to a vertical direction, in the direction of gravity, corresponding to the longitudinal direction of the chamber in its usual position of use.

What is meant by substantially horizontal, longitudinal or vertical is a direction/a plane that forms an angle of at most ±20°, or even of at most 10° or at most 5° with a horizontal, longitudinal or vertical direction/plane.

What is meant by substantially parallel, perpendicular or at right angles, is a direction/an angle that diverges from a parallel or perpendicular direction or from a right angle by an angle of at most ±20°, or even at most 10° or at most 5°.

Figure 1:
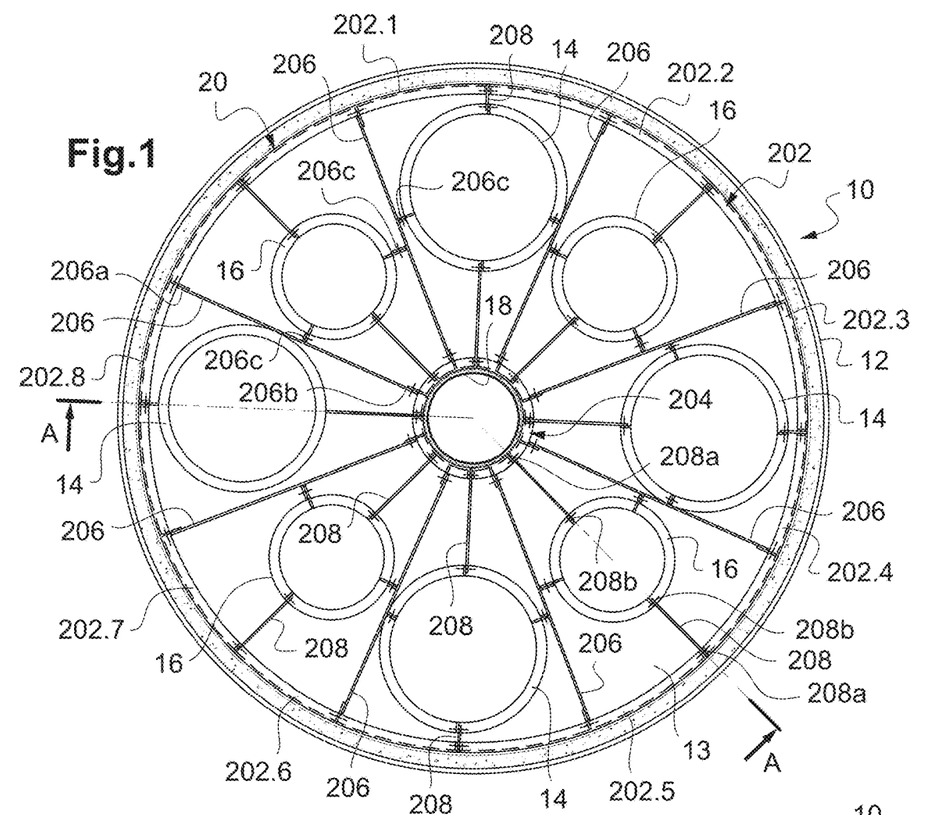
FIG. 1 is a depiction in cross section of a chamber of a fluid catalytic cracking unit according to one embodiment of the invention.

FIG. 1 depicts a chamber 10 of a fluid catalytic cracking unit, here a regenerator chamber. This chamber, of cylindrical shape in this instance, has a lateral wall 12. However, the invention is not restricted to a chamber of a particular shape. This lateral wall 12 delimits an internal volume 13 having a longitudinal axis X perpendicular to the plane of FIG. 1. The chamber 10 is provided with a plurality of mechanical separation cyclones: a series of primary cyclones 14 and a series of secondary cyclones 16.

The cyclones are used to separate the particles of catalyst from the gases circulating in the unit. These are pieces of equipment that use centrifugal force to mechanically separate particles suspended in a gas. The cyclones comprise a chamber, generally essentially cylindro-conical, designed to force the gas introduced into the body to rotate quickly, for example by introducing the gas tangentially to the circumference of the chamber, near the wall. Under the effect of centrifugal force, the solid particles trapped in the vortex move toward the wall, where they lose their speed as a result of friction and drop into the lower part of the equipment, before exiting via the apex of the cone. The gas follows the wall as far as the vicinity of the apex and, once rid of the particles, reascends to the upper part to exit via a discharge pipe, which projects partially into the chamber.

A cyclone thus conventionally comprises:
a separation chamber, which generally comprises a cylindrical upper part and a conical lower part,
a first inlet pipe opening into the chamber, situated in the upper part thereof,
a second gas outlet pipe situated in the upper part of the chamber, and
a third particle outlet pipe situated in the lower part of the chamber.

Figure 2:
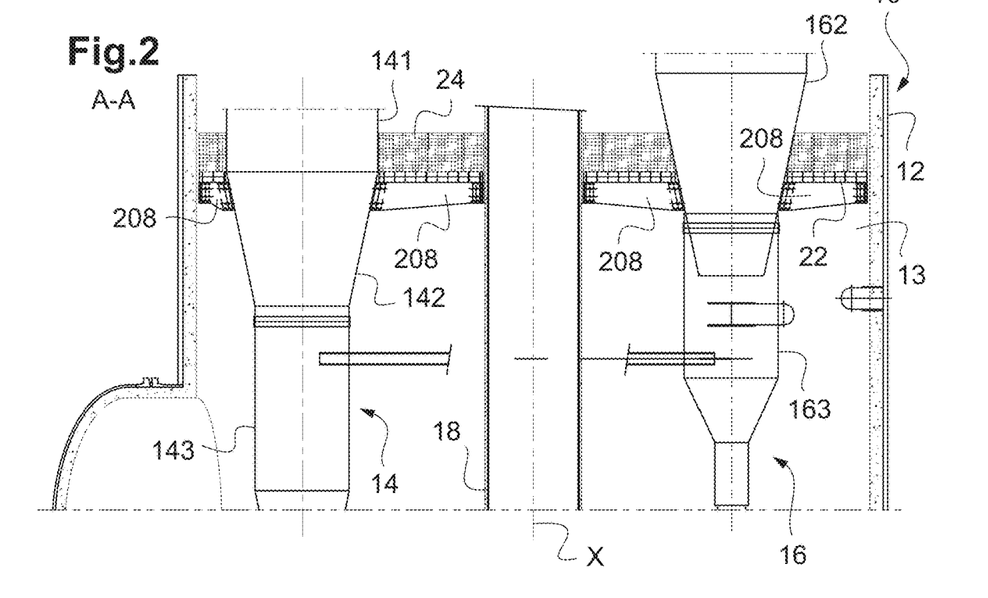
FIG. 2 is a view in longitudinal section of the chamber of FIG. 1 sectioned on A-A.

FIGS. 1 and 2 show only:
for the primary cyclones 14: a portion of the cylindrical upper part 141 of the chamber, the conical lower part 142 of the cyclone chamber and a portion of the particle outlet pipe 143,
for the secondary cyclones 16: the conical lower part 162 of the cyclone chamber, and a portion of the particle outlet pipe 163.

In the usual way, these cyclones 14, 16 are arranged vertically with their longitudinal axis extending substantially vertically.

The cyclones 14, 16 are thus situated inside the internal volume 13 substantially in the one same horizontal plane perpendicular to the longitudinal axis X. In this instance they are uniformly distributed about the longitudinal axis X, the primary cyclones 14 alternating with the secondary cyclones 16. In the example, four primary cyclones 14 and four secondary cyclones 16 are provided. However, the invention is not restricted to any particular number of cyclones or to any particular layout thereof.

In the embodiment depicted in FIGS. 1 to 10, the various cyclones 14, 16 are arranged around a tubular pipe 18 situated at the center of the chamber 10. This pipe 18 here is a cylindrical pipe having the same longitudinal axis X as the chamber 10.

According to the invention, the chamber 10 has, inside its volume 13, a support device 20 intended more particularly to support a grate and an internal packing.

The support device 20 comprises:
a peripheral support element 202 of annular shape, extending along the lateral wall 12 in a plane perpendicular to the axis of revolution X and distant from this lateral wall 12 by a predetermined clearance,
a central support element 204 extending near the longitudinal axis X of the chamber 10, in this instance around the tubular pipe 18, in the same plane as the peripheral support element 202 (FIG. 2),
a plurality of beams, in this instance rectilinear, 206, 208 which extend in the same plane perpendicular to the longitudinal axis X as the peripheral and central support elements, at least one end of each beam 206, 208 being fixed to the central support element 204 or to the peripheral support element 202, each beam 206, 208 being fixed to a mechanical separation cyclone by another end or by a fixing part distant from its ends.

In this example, the beams extend radially. Nevertheless, the invention is not restricted to a particular arrangement of beams, provided that these beams are connected to a cyclone and to another element of the support device, namely in this example, the peripheral support element or the central support element.

In the present application, when beams connect or are connected to elements, it is considered that this connection is rigid, or in other words that the beam is secured to the element without the possibility of movement.

According to the invention, the support device is thus only fixed to the cyclones 14, 16 via the beams 206, 208, but is not fixed directly to the chamber 10, notably to the lateral wall 12 thereof. Thus, the peripheral and central support elements act as a chassis supporting the beams and, despite the reduced amount of space left available by the primary and secondary cyclones, the various elements of the support device 20 according to the invention can be fitted easily.

It will be noted that the peripheral support element 202 and the central support element 204 are respectively distant from the lateral wall 12 and from the tubular reactor 18 by a predetermined clearance in the plane of these support elements. This clearance is preferably small enough to prevent, or limit, the passage of solid particles circulating inside the chamber and advantageously large enough to accommodate the thermal expansion of the support device or potentially so that it does not jam at a crooked angle. It may notably be determined by those skilled in the art according to the characteristics of the solid particles and according to the coefficients of thermal expansion of the materials used.

FIGS. 1-10 show:
first beams 206 which have a first end 206a fixed to the peripheral support element 202 and a second end 206b fixed to the central support element 204; these first beams also comprise one or two fixing parts 206c distant from the first and second ends 206a, 206b respectively and fixed to one of the adjacent cyclones or to the two adjacent cyclones,
second beams 208 having a first end 208a fixed to the central support element 204 or to the peripheral support element 202 and a second end 208b fixed to a cyclone 14, 16, which may be a primary or a secondary cyclone.

It will be noted that the second beams 208 extending between a primary cyclone 14 and the peripheral support element 202 are relatively short with respect to the others.

To make it easier to install the support device 20 inside the chamber 10, the peripheral support element 202 is made as a number i of portions 202i defined in the plane of the support elements by angular sectors the center of which is the center of the internal volume, here situated on the longitudinal axis X. These portions are thus placed end to end and assembled via their ends. In this instance, eight equal portions 202.1 to 202.8 are provided (see FIGS. 1 and 3).

Figure 3:
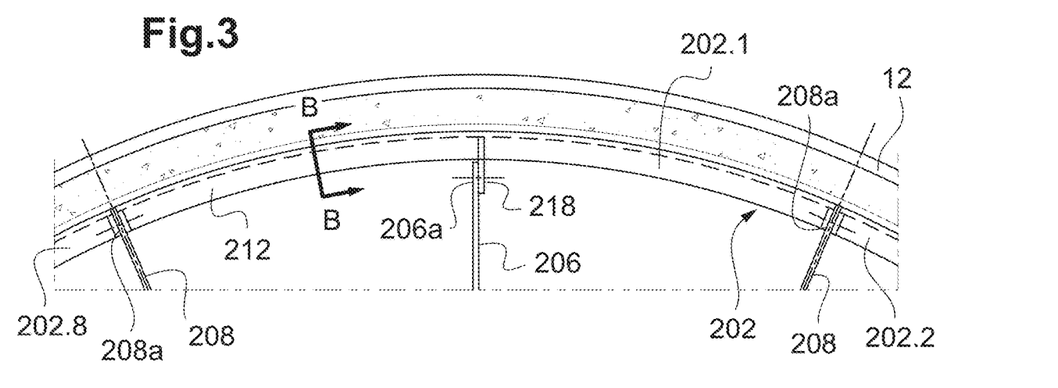
FIG. 3 is a detail view of FIG. 1 of a peripheral support element.

The assembly between three adjacent portions 202.8, 202.1 and 202.2 can be seen in FIG. 3. In the example depicted, these portions 202.1 to 202.8 are assembled by threaded fastener systems but they could be assembled by riveting, welding, etc.

Similarly, the central support element 204 is also formed by i portions 204.i assembled in pairs via their ends and defined in the plane by angular sectors. Here, four equal portions 204.1 to 204.4 are assembled using threaded fastener systems, three of which are more clearly visible in FIG. 4.

Figures 4, 5:
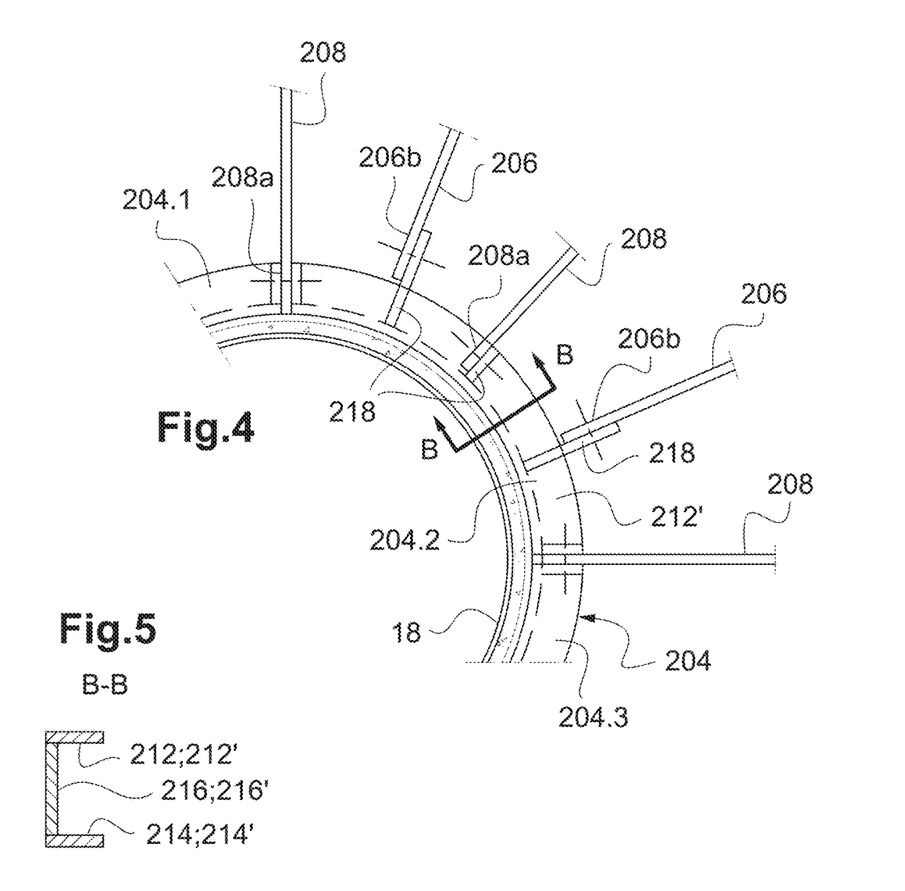
FIG. 4 is a detail view of the central support element in FIG. 1.
FIG. 5 is a view in cross section on B-B of FIGS. 3 and 4.
Figure 6:
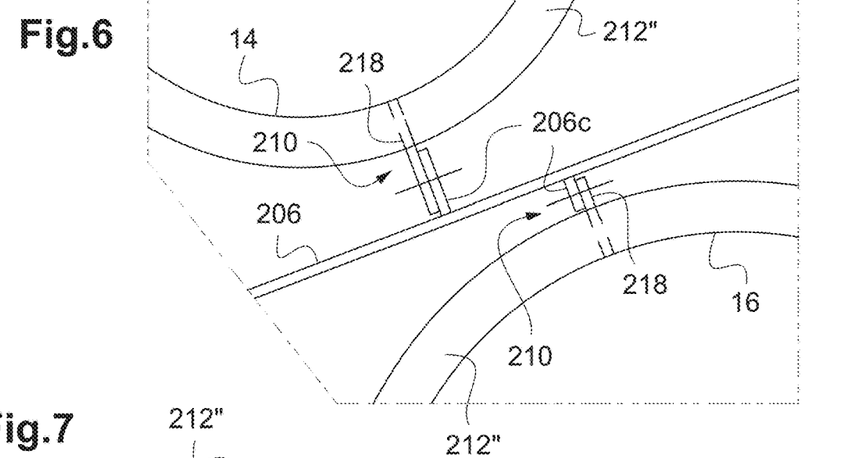
FIG. 6 is a detail view of the assembly of a beam with two mechanical separation cyclones.

In order to facilitate the fixing of the beams, the ends thereof that are fixed to the central support element 204 or to the peripheral support element 202 may be fixed between two assembled ends of portions 202.i or 204.i, as visible in FIGS. 3 and 4.

In the example depicted, the fixing of the beams 206, 208 to the cyclones 14, 16 is achieved by means of support elements 210 which are configured to support one end of a second beam 208 or a fixing part of a first beam 206.

In general, the various support elements 202, 204, 210 are configured to support either first or second beam ends or a first beam fixing part. For this purpose, they may be designed to accept these ends or a fixing part, and have, for example, a complementing shape. Provision may thus be made for the support elements and the beam ends or beam fixing parts to collaborate in a similar way to male/female elements.

One particular embodiment of the fixing of the various beams to the support elements is described in the remainder of the description with reference to FIGS. 3 to 9.

In general, each support element has an upper wall and a lower wall which are spaced apart, perpendicular to the longitudinal axis X of the lateral wall 12.

The peripheral 202 and central 204 support elements thus each comprise an upper wall 212, 212' and a lower wall 214, 214' respectively (see FIGS. 3 to 5). These walls are connected by an end wall 216, 216' respectively along their edge. In the case of the peripheral support element 202, the end wall extends from the side of the lateral wall 12, so that the upper 212, lower 214 and end 216 walls define a groove (see FIG. 5) the opening of which is directed toward the longitudinal axis X. In the case of the central support element 204, the end wall 216' is situated on the side of the tubular reactor 18, namely on the side of the longitudinal axis X, so that the opening of the groove faces toward the lateral wall 12. The two grooves are thus open toward one another.

Figure 7:
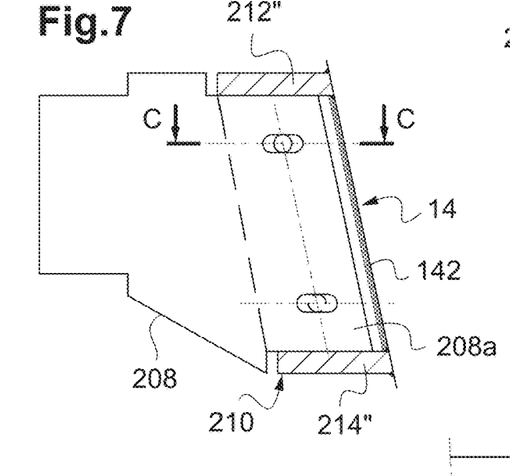
FIGS. 7 and 8 are of side views of an assembly of a beam with a cyclone support element according to two embodiments.
Figure 8:
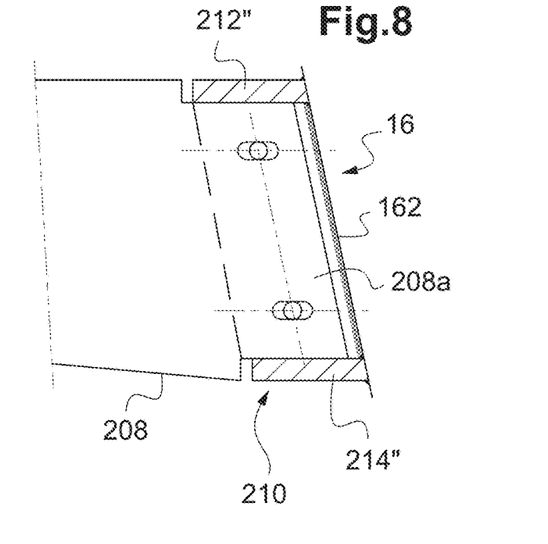
Figure 9:
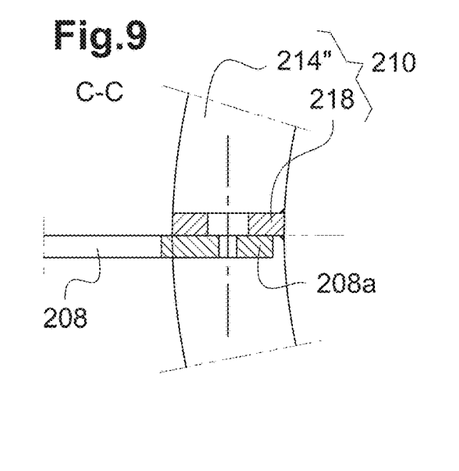
FIG. 9 is a view in section on C-C of FIG. 7.
Figure 10:
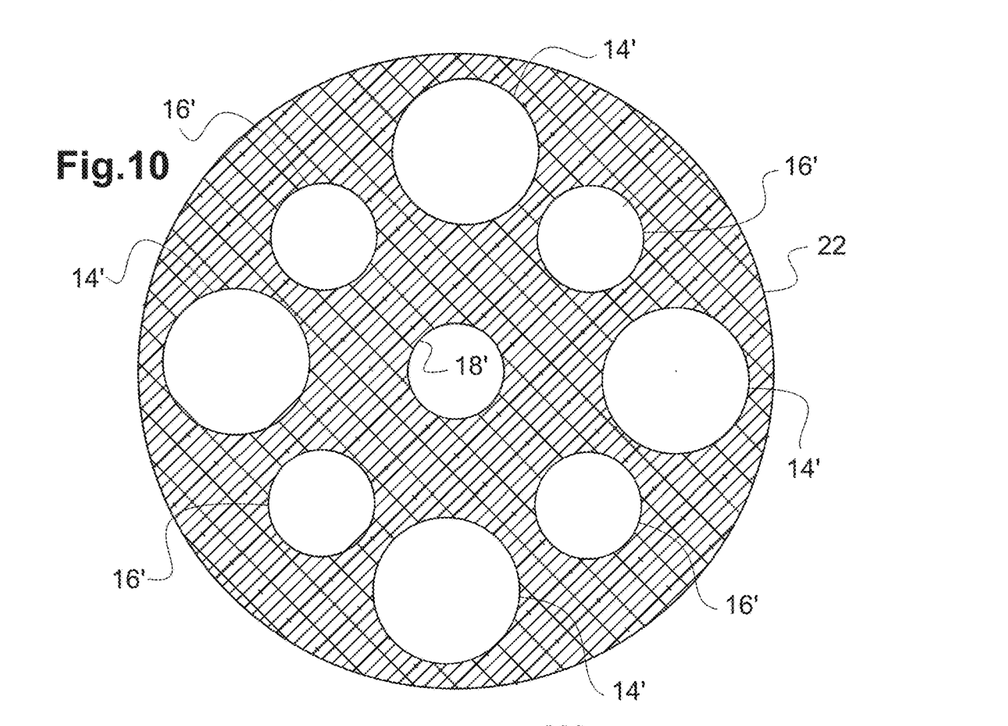
FIG. 10 is a view from above of a grate supported by the support device.

Regarding the cyclone support elements 210, these each have an upper wall 212" and a lower wall 214", which in this instance are welded directly to a lateral wall of the corresponding cyclone, in this instance the walls 142 and 162 (see FIGS. 7, 8). However, the invention is not restricted to one particular way of fixing the support elements 210 to the cyclone, any other suitable means (screw fastening, riveting, etc.) being able to be envisioned. FIGS. 7 and 8 show that the ends 208a of the beams are housed between the upper 212" and lower 214" walls.

Each support element 202, 204, 210 also has fixing walls 218 which extend perpendicular to the upper and lower walls and meet these. These fixing walls 218 extend parallel to the longitudinal axis X. They may thus have, bearing against them, planar walls secured to the beams extending likewise parallel to the longitudinal axis X. Fixing elements of the rivets, threaded fastener or other type may be used for fixing.

These fixing walls 218 are notably visible in FIGS. 3, 4, 6, 9. It will be noted that the fixing walls 218 of the peripheral 202 and central 204 support elements extend at least in part into the grooves, and in part outside of the grooves in the example depicted.

The mechanical separation cyclones 14, 16 here also have chambers exhibiting symmetry of revolution. The fixing walls 218 of the support elements 210 preferably extend radially with respect to the axis of revolution of the cyclone to which they are fixed, for better ability to withstand mechanical stresses.

The upper and lower walls of the various support elements 202, 204, 210 here take the form of flat rings. In the case of the support elements 210, these rings 212", 214" are fixed directly to the cyclones. The fixing walls 218 are also fixed directly to the cyclones and to the walls 212" and 214".

In the case of the peripheral 202 and central 204 support elements, the upper and lower walls are joined together by end walls and by the fixing walls 218. Because of their respective orientations, assembling these various walls makes it possible to achieve support elements 202, 204 which are robust even though they are not fixed to the lateral wall 12 or to the tubular pipe 18.

Each beam 206, 208 moreover comprises at least one planar wall parallel to the longitudinal axis X, pressed against a fixing wall 218 of a support element 202, 204, 210, parallel to this wall and secured to this fixing wall.

In the example, each beam is essentially made up of a rectilinear elongate flat strip parallel to the longitudinal axis X, the fixing parts 206c of the first beams 206 being planar walls perpendicular to the flat strip. Thus, the first beams 206 are substantially tangential to the cyclones to which they are fixed, more specifically to the external walls of these cyclones, and bear against the fixing walls 218 of the support elements 210 secured to the cyclones (see FIG. 6).

The shape of the beams 206, 208 allows them robustly to support a grate 22 placed on their upper face (FIGS. 2 and 10), this grate 22 being itself able to support a packing element 24. The surface of the grate 22 here conforms to the contours of the cyclones 14, 16, of the tubular pipe 18 and of the lateral wall 12 of the chamber (FIG. 10) while being separated from these elements by a predetermined clearance. For this reason it has a contour similar to the shape of the lateral wall but of smaller dimensions, and orifices 14', 16', 18' configured to accept the cyclones 14, 16 and the tubular pipe 18 respectively with a predetermined clearance.

The invention is not restricted to the embodiment described. In particular, the chamber could have no central tubular pipe. The shape and the dimensions of the central support element therefore no longer form constraints and any other shape could be used.

Figure 11:
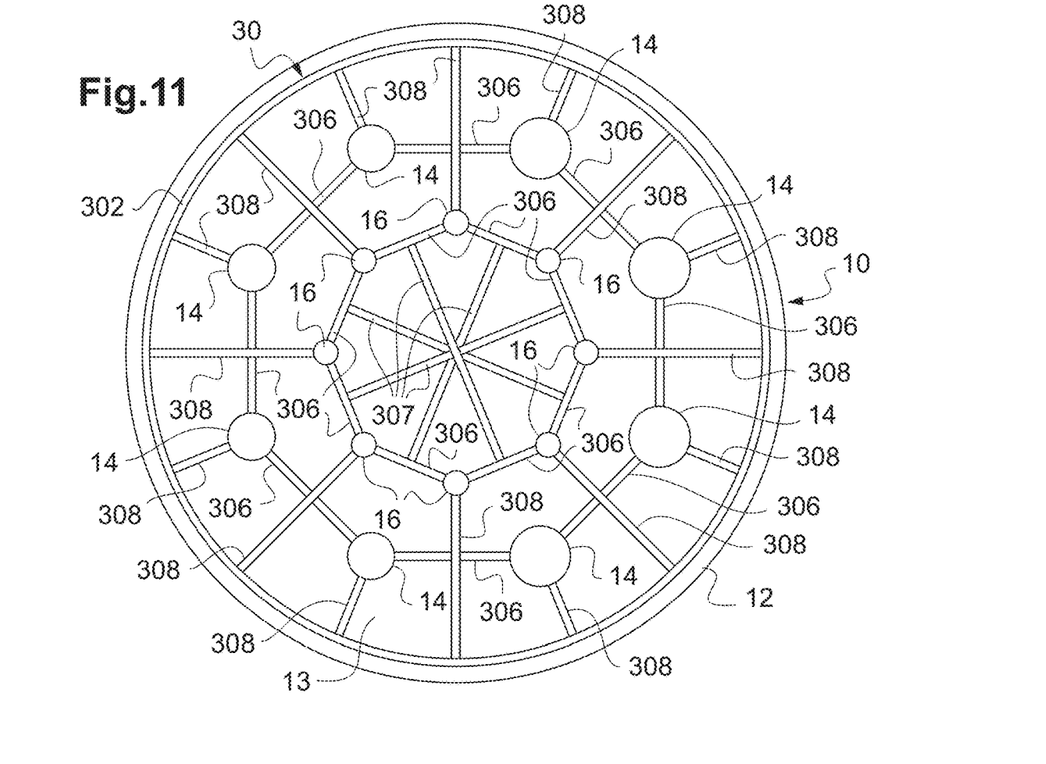
FIG. 11 is a schematic depiction in cross section of a chamber according to another embodiment of the invention.

In this case, it is also possible to dispense with the central support element, as depicted schematically in FIG. 11. Elements identical to those already described are designated therein by the same references. This figure shows the chamber 10 and the primary 14 and the secondary 16 mechanical separation cyclones. FIG. 11 depicts a view in section in the region of the particle outlet pipes of the cyclones 14, 16.

In this figure, the support device 30 according to one embodiment of the invention comprises:
 a peripheral support element 302 extending along the lateral wall 12 in a plane perpendicular to the longitudinal axis X, distant from the lateral wall by a predetermined clearance in the plane of the support element 302, a plurality of beams 306, 308 extending in the same plane as the peripheral support element 302, certain beams 306 connecting mechanical separation cyclones to one another, other beams 308 each connecting a mechanical separation cyclone to the peripheral support element 302.

Furthermore, other beams 307 connect beams 306 to one another, these beams 307 being themselves connected to one another substantially at the center of the internal volume 13.

The beams 306, 308 here are secured to a mechanical separation cyclone by one end. The structure and the way of fixing the beams may be similar to that described with reference to FIGS. 1 to 10. However, it will be noted that the invention is not limited to one particular form of beams or to one particular way of fixing these, provided that the beams can be secured to the cyclones, to the peripheral support element, to a central support element, if present, and/or to one another.

Furthermore, the arrangement of the various beams may vary very widely from one chamber to another according to the layout of the cyclones with respect to each other. Thus, the invention is not restricted to any one particular arrangement of the beams, provided that these beams are supported by the mechanical separation cyclones.

The invention claimed is:

1. A chamber of a fluid catalytic cracking unit comprising a lateral wall which delimits an internal volume having a longitudinal axis extending substantially in the direction of gravity, said chamber being provided with a plurality of mechanical separation cyclones situated inside said internal volume, characterized in that said chamber comprises, inside said internal volume, a support device secured only to the mechanical separation cyclones and comprising:
   a peripheral support element extending along the lateral wall in a plane perpendicular to the longitudinal axis (X), distant from the lateral wall by a predetermined clearance in the plane of the support element,
   a plurality of beams extending in the same plane as the peripheral support element, the beams being secured to the peripheral support element and to at least one mechanical separation cyclone by an end or by a fixing part distant from its ends.

2. The chamber as claimed in claim 1, characterized in that the support device comprises other beams extending in the same plane as the peripheral support element and chosen from one or more of the following beams:
   a beam secured to two mechanical separation cyclones by its ends or by fixing parts distant from its ends, and
   a beam connecting at least two other beams together.

3. The chamber as claimed in claim 2, characterized in that the support device comprises several beams extending in the same plane as the peripheral support element and connecting other beams with criss-crossing, these beams being secured to one another at the point(s) at which they cross.

4. The chamber as claimed in claim 1, characterized in that the support device comprises:
   a central support element extending near a central point of the internal volume, in the same plane as the peripheral support element,
   beams extending in the same plane as the peripheral support element and each connecting one or two mechanical separation cyclones to the central support element.

5. The chamber as claimed in claim 4, characterized in that the support device comprises beams extending in the same plane as the peripheral support element and connecting one or two mechanical separation cyclones to the central support element and to the peripheral support element.

6. The chamber as claimed in claim 4, characterized in that the central support element is arranged around a tubular pipe situated inside the chamber, having a longitudinal axis parallel to the longitudinal axis (X) of the lateral wall, the central support element conforming to the shape of the pipe and being separated therefrom by a predetermined clearance in the plane of the central support element.

7. The chamber as claimed in claim 1, characterized in that at least some of the mechanical separation cyclones comprise at least one support element configured to support a beam end or the fixing part.

8. The chamber as claimed in claim 1, characterized in that beams are fixed to a mechanical separation cyclone via one of their ends so that a longitudinal direction of these beams passes through a central point of said separation cyclone, in the plane in which the beam extends.

9. The chamber as claimed in claim 1, characterized in that the peripheral support element and the central support element, where present, is formed of several portions defined in the plane of the support element by angular sectors of which the center is a central point of the internal volume and in that one end of at least one beam is fixed to this support element between assembled ends of two adjacent portions.

10. The chamber as claimed in claim 1, characterized in that each support element has an upper wall and a lower wall which are spaced apart, perpendicular to the longitudinal axis, and between which a beam end or the fixing part is fixed.

11. The chamber as claimed in claim 10, characterized in that the edges of the lower and upper walls of at least one support element are connected by an end wall so as to define a groove.

12. The chamber as claimed in claim 10, characterized in that each support element has a plurality of fixing walls connecting said upper and lower walls, these fixing walls extending parallel to the longitudinal axis.

13. The chamber as claimed in claim 12, characterized in that each beam comprises at least one planar wall parallel to the longitudinal axis, pressed against a fixing wall of a support element, parallel to the latter and secured to this fixing wall.

14. The chamber as claimed in claim 1, characterized in that the mechanical separation cyclones are uniformly distributed with respect to the longitudinal axis (X), and are notably distributed symmetrically.

15. The chamber as claimed in claim 1, characterized in that a grate is laid on an upper face of said support device, said grate conforming to the shape of the lateral wall, of the mechanical separation cyclones and of the tubular pipe situated inside the chamber, when such a pipe is present, said grate being separated from the lateral wall, from the mechanical separation cyclones and, where applicable, from the tubular pipe by a predetermined clearance, in the plane of the support element.

16. The chamber as claimed in claim 1, characterized in that said chamber is a chamber of a regenerator.

* * * * *